(12) United States Patent
Korpitsch

(10) Patent No.: US 12,131,220 B2
(45) Date of Patent: Oct. 29, 2024

(54) METHOD FOR RECOGNIZING 2D CODE INFORMATION

(71) Applicant: VIRNECT CO., LTD., Seoul (KR)

(72) Inventor: Thorsten Korpitsch, Schwechat Vienna (AT)

(73) Assignee: VIRNECT CO., LTD., Seoul (KR)

( * ) Notice: Subject to any disclaimer, the term of this patent is extended or adjusted under 35 U.S.C. 154(b) by 0 days.

(21) Appl. No.: 18/493,758

(22) Filed: Oct. 24, 2023

(65) Prior Publication Data
US 2024/0143960 A1     May 2, 2024

(30) Foreign Application Priority Data

Oct. 26, 2022    (KR) ........................ 10-2022-0139323

(51) Int. Cl.
*G06K 7/14*        (2006.01)
*G06T 7/11*        (2017.01)
(Continued)

(52) U.S. Cl.
CPC .............. *G06K 7/1417* (2013.01); *G06T 7/11* (2017.01); *G06T 7/74* (2017.01); *G06T 11/00* (2013.01); *G06T 2207/20021* (2013.01)

(58) Field of Classification Search
CPC .................................................. G06K 7/1417
(Continued)

(56) References Cited

FOREIGN PATENT DOCUMENTS

| JP | 2020160961 A | 10/2020 |
|---|---|---|
| KR | 20070019375 A | 2/2007 |

(Continued)

OTHER PUBLICATIONS

Ji-In Kim et al, Implementation of QR Code Recognition Technology Using Smartphone Camera for Indoor Positioning, Energies, 2021, vol. 14, Issues 2759, pp. 1-13, MDPI, Basel, Switzerland.

*Primary Examiner* — Rafferty D Kelly
(74) *Attorney, Agent, or Firm* — STIP Law Group, LLC

(57) ABSTRACT

The present disclosure provides a method for recognizing 2D code information. A method for recognizing 2D code information according to the present disclosure, which is related to a method for recognizing 2D code information by capturing a 2D code image composed of rectangular cells, comprises obtaining a 2D code image using a mobile device equipped with a camera or an image capture device; performing a first data extraction process that identifies individual blocks storing a position pattern, an alignment pattern, and data from the obtained 2D code image; setting a first weight for removing outer blocks located outside a line connecting the position pattern and the alignment pattern with respect to a central block among the individual blocks of the 2D code image on which the first data extraction process has been performed; partitioning inner blocks located inside the position pattern and the alignment pattern among individual blocks of the 2D code image into a plurality of block groups composed of at least one or more inner blocks and setting a second weight for determining whether to select a block group according to a recognition rate of blocks constituting each block group; removing outer blocks set to the first weight and selecting a block group for which a weight has been set as having a high recognition rate among block groups set to the second weight; determining and recognizing a 2D code by comparing the selected block group with a block group of a pre-stored 2D code; and displaying an object to a user in the form of augmented reality based on the recognized 2D code information.

8 Claims, 15 Drawing Sheets

(51) Int. Cl.
*G06T 7/73* (2017.01)
*G06T 11/00* (2006.01)

(58) Field of Classification Search
USPC .................................................. 235/462.11
See application file for complete search history.

(56) References Cited

FOREIGN PATENT DOCUMENTS

| | | |
|---|---|---|
| KR | 20120003231 A | 1/2012 |
| KR | 20160035290 A | 3/2016 |
| KR | 20170038468 A | 4/2017 |

(a)

(b)

(c)

(a)

(b)

(c)

(d)

(a)

(b)

(c)

(d)

(e)

(f)

(g)

(h)

(i)

(j)

(k)

(l)

(m)

(n)

(o)

(p)

(o)  (p)

METHOD FOR RECOGNIZING 2D CODE INFORMATION

CROSS-REFERENCE TO RELATED APPLICATIONS

This application claims the priority of the Korean Patent Applications NO 10-2022-0139323 filed on Oct. 26, 2022, in the Korean Intellectual Property Office. The entire disclosures of all these applications are hereby incorporated by reference.

BACKGROUND

Field

The present disclosure relates to a technical field for recognizing 2D codes and, more particularly, to a method for recognizing 2D code information, which enables quick and accurate recognition of 2D code information by extracting only the blocks necessary to determine a specific 2D code from an obtained 2D code image.

RELATED ART

Augmented reality is a type of virtual reality. Unlike ordinary virtual reality, which excludes the real world and provides users with only the perception of a complete virtual world, augmented reality provides both the real world and virtual objects added to or synthesized with the real world.

In other words, while virtual reality completely replaces the real world, augmented reality is a concept that supplements and augments the real world.

Augmented reality is used across diverse fields, improving the value of the real world in areas such as life, culture, and industry. An example of augmented reality may be found through <sponsor advertisements in the sports broadcasting stadiums>. When watching broadcasts of various sports games, viewers may see sponsor advertisements at various places throughout the stadium. Various types of posters or electronic signage are used at specific spaces designated for advertising. If augmented reality is applied to the advertisement above, the specific spaces for advertisements may remain unused, and the advertisement content may be synthesized with the unused spaces to be broadcast in real-time. Augmented reality may deliver consumers clear and diverse advertisements at a low cost, with almost no replacement cost; furthermore, it is possible to display different advertisements based on geographic regions or countries.

Also, augmented reality may be applied for <product information display>. Various types of barcodes are attached to industrial products, which enables a barcode reader to recognize the product's information easily and quickly. For example, when a user captures an image of a product's barcode using the camera of a portable terminal equipped with the functionality of augmented reality, the image and information of the product may be provided to the user in the form of augmented reality.

In other words, the augmented reality advertisements may be presented to users in various forms, ranging from basic information such as price, raw materials, and production location along with product images to multimedia information such as video recipes, related advertisements, and associated events.

Two-dimensional (2D) codes are widely used as markers for augmented reality. While existing codes express information in a one-dimensional linear form, 2D codes express information in a 2D plane structure. Therefore, 2D codes are more efficient and may store and express more information within the same area compared to one-dimensional codes. Examples of 2D codes include PDF-417 code, Quick Response (QR) code, Aztec code, Quickmark, Data Matrix, and MaxiCode.

Since 2D codes may consolidate a large amount of information in one place, the 2D codes are extensively used in logistics, payment, authentication, advertising, and various other applications, including the augmented reality applications.

Typically, a method for recognizing a 2D code involves capturing the 2D code using a 2D code recognition application installed in a mobile device or a separate scanner and extracting the stored information.

At this time, acquisition of a 2D code image is accomplished by scanning the code multiple times through a scanner, and the stored information is recognized through a data processing process comprising positioning, segmenting, and decoding of the acquired 2D code image.

However, according to conventional methods of the prior art, the information in the 2D code may only be extracted and recognized when the 2D code is captured after being aligned precisely within a rectangular frame set in a camera or scanner.

Therefore, the 2D code information may not be obtained unless the 2D code image is captured with precise alignment by the camera or scanner.

Also, when a 2D code image is captured, the recognition process in the conventional methods relies on extracting entire blocks (individual blocks forming the code area) in the captured image in the form of information represented by black and white colors.

In other words, even when it is unclear whether a specific block in the captured 2D code image is black or white, the block is arbitrarily assigned to one of the colors, and the recognition process to extract information is repeatedly performed.

Also, a related computational process is complicated because a 2D code is determined by comparing logical values of the entire blocks in the 2D code image with the information of pre-stored 2D codes, and information of the 2D code is then extracted. In addition, if a captured block image is defective, the above process has to be performed repeatedly until matching information is found.

Meanwhile, recently, since 2D codes are attached to objects with various geometric structures, such as specific parts of a product, an object, or a space, the resulting 2D code images may be rotated or tilted in various directions. As a result, it becomes difficult to determine a 2D code and recognize related information from the captured 2D barcode image, preventing the 2D codes from being applied to augmented reality for displaying information together with products or goods.

PRIOR ART REFERENCES

Patents

Korean application patent publication No. 10-2016-0035290 (Publication date: Mar. 31, 2016)

SUMMARY

The present disclosure provides a method for recognizing 2D code information, which removes blocks located in the peripheral area distant from the central block of a 2D code image and performs computations related to determining the 2D code by selecting blocks exhibiting a high recognition rate among those blocks located in the internal area of the 2D code image.

Also, the present disclosure provides a method for recognizing 2D code information, which sets logical values and visibility for the blocks constituting a 2D code image, reduces computations and quickly determines the 2D code by excluding those blocks with visibility lower than or equal to a preset reference value from a computational process for determining the 2D code.

Also, the present disclosure provides a method for recognizing 2D code information, which sets a first weight for removing blocks in the outermost area among the blocks constituting the 2D code image, partitions blocks in the inner area into a plurality of blocks including at least one or more blocks and sets a second weight that determines whether to select a block group, thereby minimizing the number of computations for determining a 2D code.

Also, the present disclosure provides a method for recognizing 2D code information, which enables quick and more accurate determination of a 2D code by calculating the degree of rotation and tilt using block groups including at least one or more blocks among the blocks constituting the 2D code image and a fixed pattern (specific pattern) constituting the 2D code.

To solve the problem of the prior art, the present disclosure provides a method for recognizing 2D code information according to the present disclosure, which is related to a method for recognizing 2D code information by capturing a 2D code image composed of rectangular cells, the method comprising obtaining a 2D code image using a mobile device equipped with a camera or an image capture device; performing a first data extraction process that converts the obtained 2D code image into a greyscale image and identifies individual blocks storing a position pattern, an alignment pattern, and data; setting a first weight for removing outer blocks located outside a line connecting the position pattern and the alignment pattern with respect to the central block among the individual blocks of the 2D code image on which the first data extraction process has been performed; partitioning inner blocks located inside the position pattern and the alignment pattern among individual blocks of the 2D code image into a plurality of block groups composed of at least one or more inner blocks and setting a second weight for determining whether to select a block group according to a recognition rate of blocks constituting each block group; removing outer blocks set to the first weight and selecting a block group for which a weight has been set as having a high recognition rate among block groups set to the second weight; determining and recognizing a 2D code by comparing the selected block group with a block group of a pre-stored 2D code; and displaying, based on the recognized 2D code information, an object to which the 2D code is attached to a user in the form of augmented reality.

Also, in a method for recognizing 2D code information according to the present disclosure, a 2D code for recognizing the 2D code information includes a position pattern disposed at three neighboring corners among corners of a rectangular cell and an alignment pattern disposed at one corner; a timing pattern disposed between the position patterns; and first and second auxiliary timing patterns disposed between the alignment pattern and the position pattern and facing the timing pattern.

Here, the first data extraction process includes setting a logical value corresponding to black or white for each block constituting the obtained 2D code image; setting a logical value representing visibility corresponding to the degree of visual prominence of each block constituting the obtained 2D code image; determining the position of each block constituting the obtained 2D code image using the timing pattern and the first and second auxiliary timing patterns constituting the 2D code; and when the visibility of each block is lower than or equal to a preset reference value, excluding the corresponding blocks from computations for determining a 2D code.

Also, in the method for recognizing 2D code information according to the present disclosure, the partitioning of the inner blocks into a plurality of block groups composed of at least one or more inner blocks includes partitioning four blocks into one block group, and setting a second weight to the block group includes considering a block group whose constituting four blocks show black and white colors in an alternate fashion as yielding the highest recognition rate and setting a weight with the highest selection priority to the corresponding block group.

Also, in the method for recognizing 2D code information according to the present disclosure, the setting of the second weight to the block group includes considering a block group whose constituting four blocks are all in black or white color as yielding the lowest recognition rate and setting a weight with the lowest selection priority to exclude the corresponding block group from computations for determining a 2D code; when the second weight is set to the block group, obtaining distance values between the position pattern and at least two selected block groups located on a straight line passing through the position pattern; comparing the obtained distance values with distance values between the position pattern and block groups in pre-stored 2D code information and determining if there exists a change in the distance values; and if there is no change between the obtained distance values and the distance values in the pre-stored 2D code information, determining that rotation and tilt occur in the direction orthogonal to a straight line connecting the position pattern and at least two block groups.

Also, the method for recognizing 2D code information according to the present disclosure includes, when the obtained distance values are different from the distance values in the pre-stored 2D code information, determining that rotation and tilt have occurred in the horizontal direction or in an inclined direction at a predetermined angle from the horizontal direction with respect to a straight line connecting the position pattern and at least two block groups.

The method for recognizing 2D code information according to the present disclosure provides an effect of removing blocks located in the peripheral area distant from the central block of a 2D code image and performing computations related to determining the 2D code by selecting blocks exhibiting a high recognition rate among those blocks located in the internal area of the 2D code image.

Also, the method for recognizing 2D code information according to the present disclosure provides an effect of setting logical values and visibility for the blocks constituting a 2D code image, reducing computations and quickly determining the 2D code by excluding those blocks with visibility lower than or equal to a preset reference value from a computational process for determining the 2D code.

Also, the method for recognizing 2D code information according to the present disclosure provides an effect of setting a first weight for removing blocks in the outermost area among the blocks constituting the 2D code image, partitioning blocks in the inner area into a plurality of blocks including at least one or more blocks and setting a second weight that determines whether to select a block group, thereby minimizing the number of computations for determining a 2D code.

Also, the method for recognizing 2D code information according to the present disclosure provides an effect of enabling quick and more accurate determination of a 2D code by calculating the degree of rotation and tilt using block groups including at least one or more blocks among the blocks constituting the 2D code image and a fixed pattern (specific pattern) constituting the 2D code.

DESCRIPTION OF EXEMPLARY EMBODIMENTS

Since the present disclosure may be modified in various ways and may provide various embodiments, specific embodiments will be depicted in the appended drawings and described in detail with reference to the drawings. The effects and characteristics of the present disclosure and a method for achieving them will be clearly understood by referring to the embodiments described later in detail together with the appended drawings. However, it should be noted that the present disclosure is not limited to the embodiment disclosed below but may be implemented in various forms. In the following embodiments, the terms such as first and second are introduced to distinguish one element from the others, and thus the technical scope of the present disclosure should not be limited by those terms. Also, a singular expression should be understood to indicate a plural expression unless otherwise explicitly stated. The term include or have is used to indicate existence of an embodied feature or constituting element in the present specification; and should not be understood to preclude the possibility of adding one or more other features or constituting elements. Also, constituting elements in the figure may be exaggerated or shrunk for the convenience of descriptions. For example, since the size and thickness of each element in the figure has been arbitrarily modified for the convenience of descriptions, it should be noted that the present disclosure is not necessarily limited to what has been shown in the figure.

In what follows, embodiments of the present disclosure will be described in detail with reference to appended drawings. Throughout the specification, the same or corresponding constituting element is assigned the same reference number, and repeated descriptions thereof will be omitted.

Figure 1:
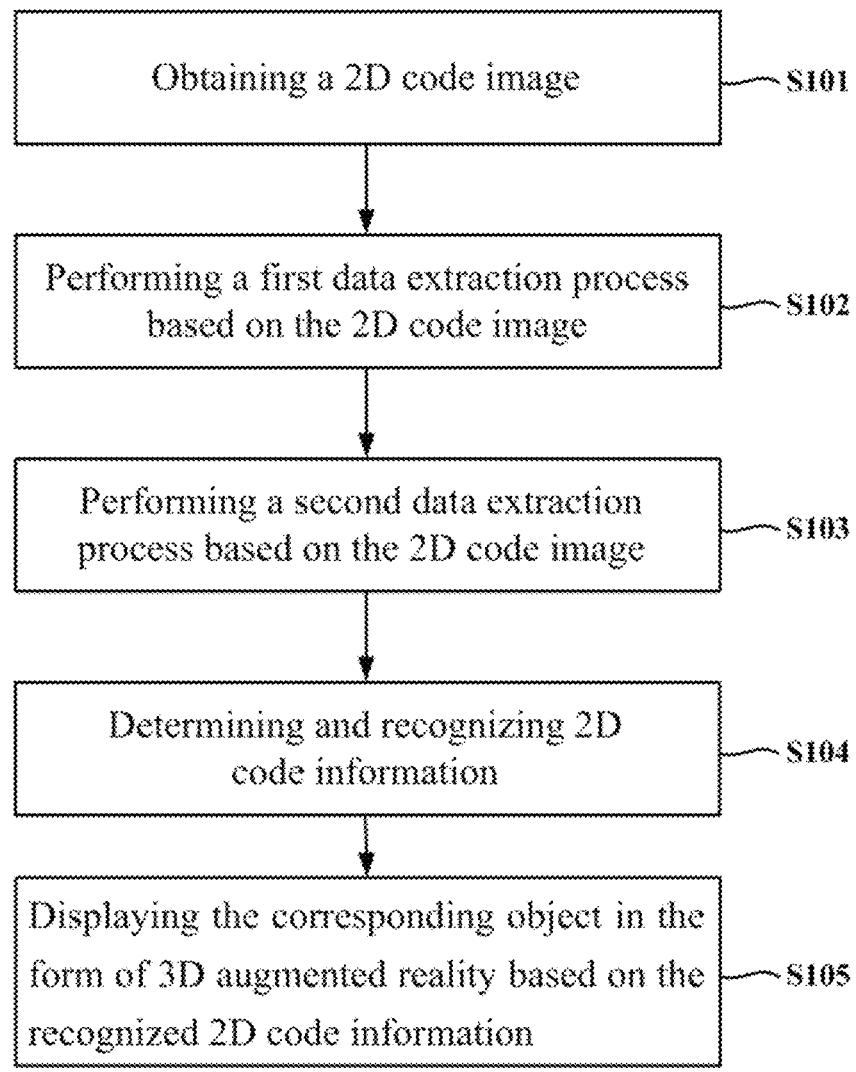
FIG. 1 is a flowchart illustrating a method for recognizing 2D code information according to one embodiment.
Figure 2:
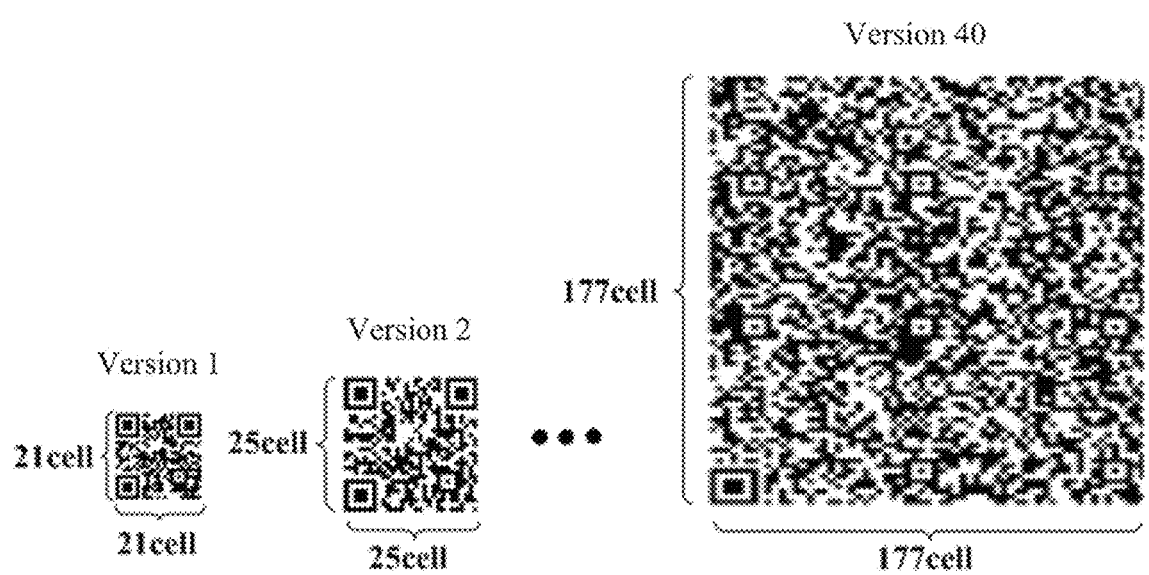
FIG. 2 illustrates QR codes with commonly known cell sizes.
Figure 3:
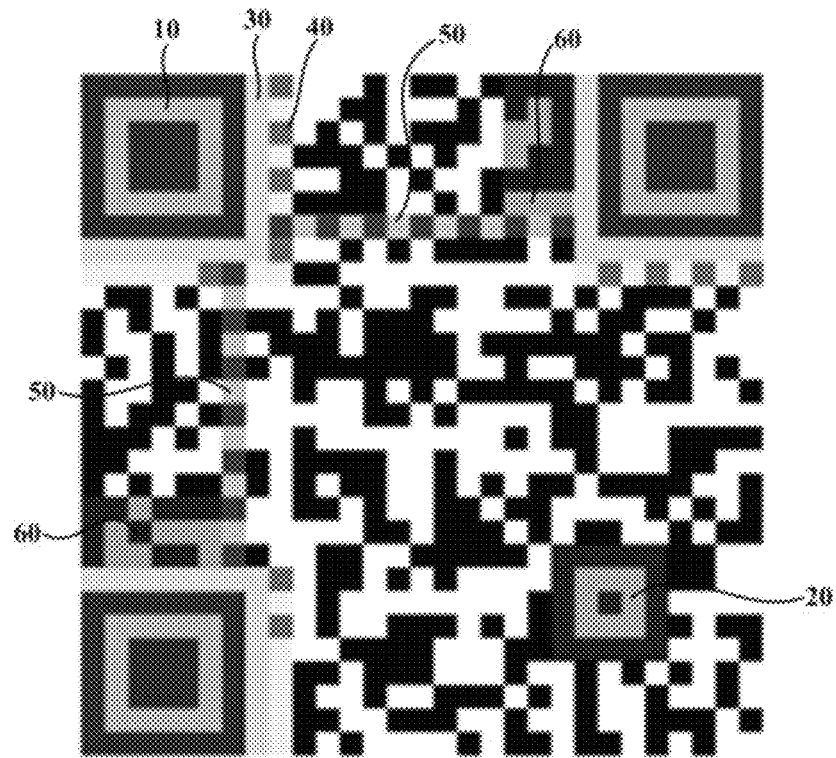
FIG. 3 shows the structure of a 2D code for information recognition according to one embodiment of the present disclosure.
Figure 4A:
FIG. 4A, FIG. 4B and FIG. 4C show 2D code images acquired by a method for recognizing 2D code information according to one embodiment of the present disclosure.
Figure 4B:
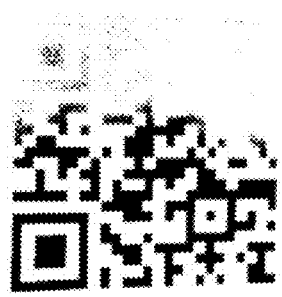
Figure 4C:
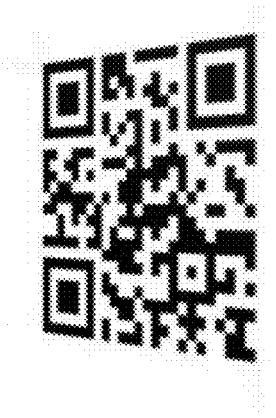

FIG. 1 is a flowchart illustrating a method for recognizing 2D code information according to one embodiment. FIG. 2 illustrates QR codes with commonly known cell sizes. FIG. 3 shows the structure of a 2D code for information recognition according to one embodiment of the present disclosure. FIG. 4 shows 2D code images acquired by a method for recognizing 2D code information according to one embodiment of the present disclosure.

Referring to FIGS. 1 to 4, a method for recognizing 2D code information of the present disclosure comprises obtaining a 2D code image using a mobile device equipped with a camera or an image capture device S101, performing a first data extraction process for determining a specific 2D code based on the obtained 2D code image S102, performing a second data extraction process for determining a 2D code on the 2D code image for which the first data extraction process has been performed S103, determining and recognizing a 2D code through the second data extraction process S104, and displaying an object to a user in the form of augmented reality based on the recognized 2D code information S105.

Examples of a mobile device for recognizing a 2D code include a feature phone, a smartphone, a palm-top computer, a personal computer (PC), a tablet computer, or a personal digital assistant (PDA).

Also, the mobile device may be used by being integrated into a head-mount display (HMD) device which implements augmented reality.

Also, the obtaining of the 2D code image includes obtaining an image, which includes an object captured through a camera, and separating an image similar to a 2D code image.

For example, if the captured object is a product or a part of a specific space, and a 2D code is attached to the product, or the specific space is a parking lot, the captured image may include a plurality of objects, such as a pillar, a wall, and a 2D code attached thereto. From the image, a specific image consisting of only black and white sections may be selected and provided.

Also, as described above, if an image captured by a camera is expected to contain 2D code images, a grayscale image conversion process may be additionally performed to the image, and the converted image may then be provided to the user. The grayscale image conversion may be performed during the first data extraction process below.

The first data extraction process S102 may be performed selectively. The first data extraction process may be a boundary detection process that roughly distinguishes the components of the 2D code from the obtained 2D code image.

Referring to FIGS. 2 and 3, among 2D codes, the QR code consists of a plurality of blocks in black and white, which form rectangular internal grids at regular intervals. In other words, a QR code is a 2D code formed in a matrix structure comprising multiple blocks (points) arranged in parallel horizontally and vertically within a rectangle; the horizontal and vertical lengths of the rectangle vary depending on the version. Currently, QR codes have been developed from [Version 1], which has 21 square blocks on one side, to [Version 40], which has 177 square blocks on one side.

As the version increases, the number of cells constituting one side increases by 4; thus, as the version increases, the QR code may record more information. The amount of information that may be recorded in a QR code is up to 23,648 bits in the case of [Version 40]. Up to 1,817 characters may be recorded in the case of Japanese characters (general kana) or Chinese characters, 4,296 characters in the case of alphabets and numbers, and 7,089 characters in the case of numbers only. QR codes provides an advantage in that data may be restored even if part of the QR code is lost due to the excellent complementarity of the recorded data.

As shown in FIG. 3, the QR code has a position pattern 10, a timing pattern 50, an alignment pattern 20, and a version information pattern 60, format information pattern 40, and space 30.

Each version of QR code or a modified QR code contains a unique pattern. The position pattern 10 is also called a finder pattern and is a standard pattern for recognizing the initial QR code. The position pattern 10 is located at the upper left corner of the QR code cell and has a form in which black and white colors are composed at a unique ratio of 1:1:3:1:1 along any line in all 360° directions passing through the center.

Also, based on the position pattern 10 at the upper left corner, position patterns are placed on the opposite side edges of the cell, namely, at the upper right corner and the bottom left corner. In other words, the position patterns 10 may be placed at three neighboring corners.

Figure 5:
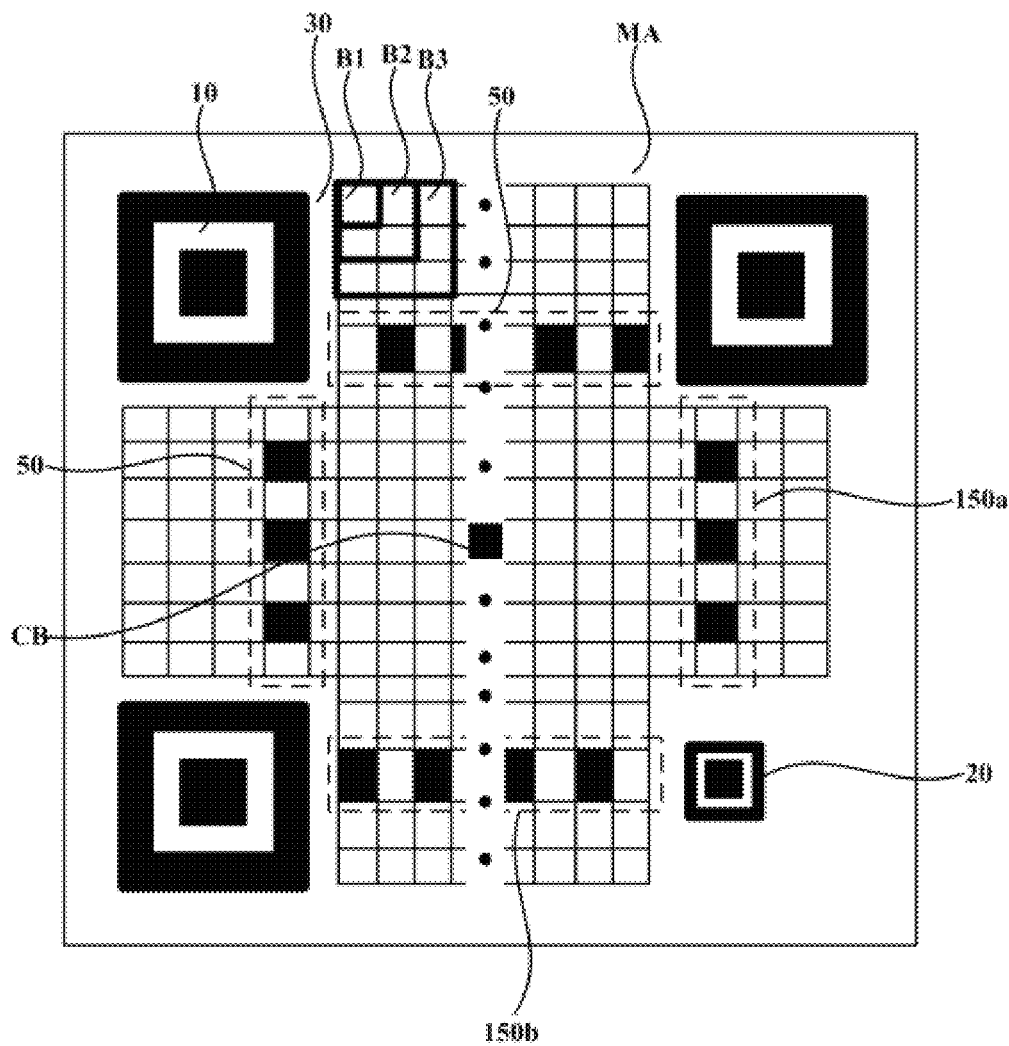
FIG. 5 and FIG. 6A, FIG. 6B, FIG. 6C, FIG. 6D illustrate a first data extraction process in a method for recognizing 2D code information according to one embodiment of the present disclosure.
Figure 6A:
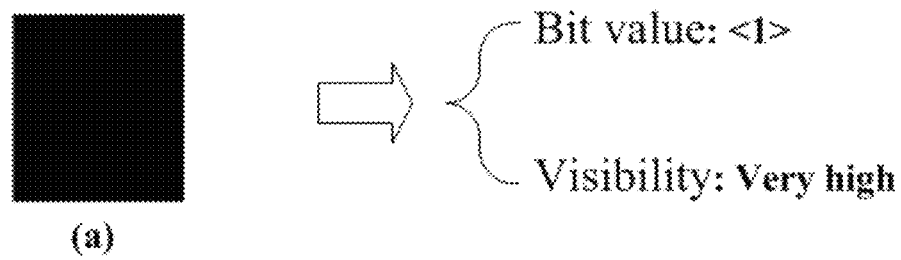
Figure 6B:
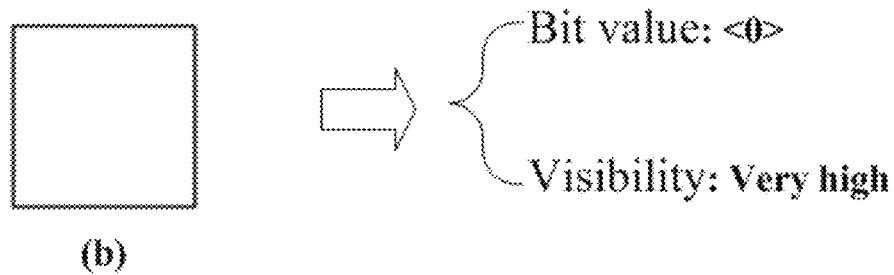
Figure 6C:
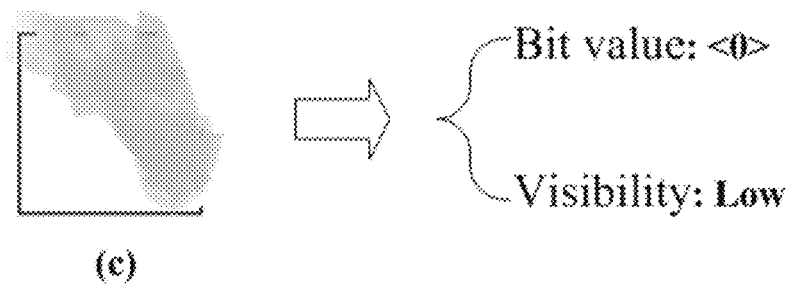
Figure 6D:
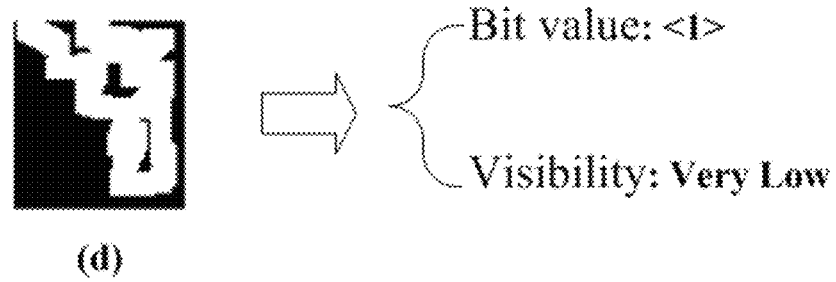

Blocks (comprising black or white blocks) that store data information of the QR code are separated from the position patterns 10 with the space 30 between them; timing patterns 50, characterized by an alternating arrangement of black and white pieces, are placed between the position patterns 10 facing each other. Accordingly, the timing patterns 50 may be arranged in parallel along the upper and left sides with respect to the center of the cells constituting the QR code. In the method for recognizing 2D code information according to the present disclosure, as shown in FIG. 5, to perform the first data extraction process in a more precise manner, the first and second auxiliary timing patterns 150*a*, 150*b* may be further disposed to face the timing patterns 50. The structure above will be described in more detail with reference to FIG. 5 and subsequent drawings.

In addition, the QR code may include an alignment pattern 20 indicating the alignment position of the 2D code and a version information pattern 60, reflecting the fact that the QR code has been released from version 1 up to 40, with an expectation of various modified versions to come. Also, the QR code may further include a format information pattern 40 representing the data type of the code information.

Referring to FIG. 4, (a) shows a standard 2D code without rotation or tilt, (b) shows a case in which part of the 2D code image is damaged, and (c) shows a case in which the 2D code image has been rotated or tilted along a specific direction.

Because objects (products, goods, buildings, and so on) are formed with various geometric surface structures, it is difficult to obtain an undistorted 2D code image without tilt or deformation, as shown in (a), if the QR code is attached to the object. Therefore, it is necessary to obtain accurate 2D code information from 2D code images such as (b) and (c).

The step S102 of FIG. 1, performing the first data extraction process for determining a specific 2D code based on the captured 2D code image, may include a process of extracting the outer and inner boundary lines of the entire QR code with respect to the position pattern 10, which is a basic pattern constituting the QR code.

In other words, the first data extraction process may determine a rough QR code image using the position pattern 10 from the captured 2D code image.

Figure 7:
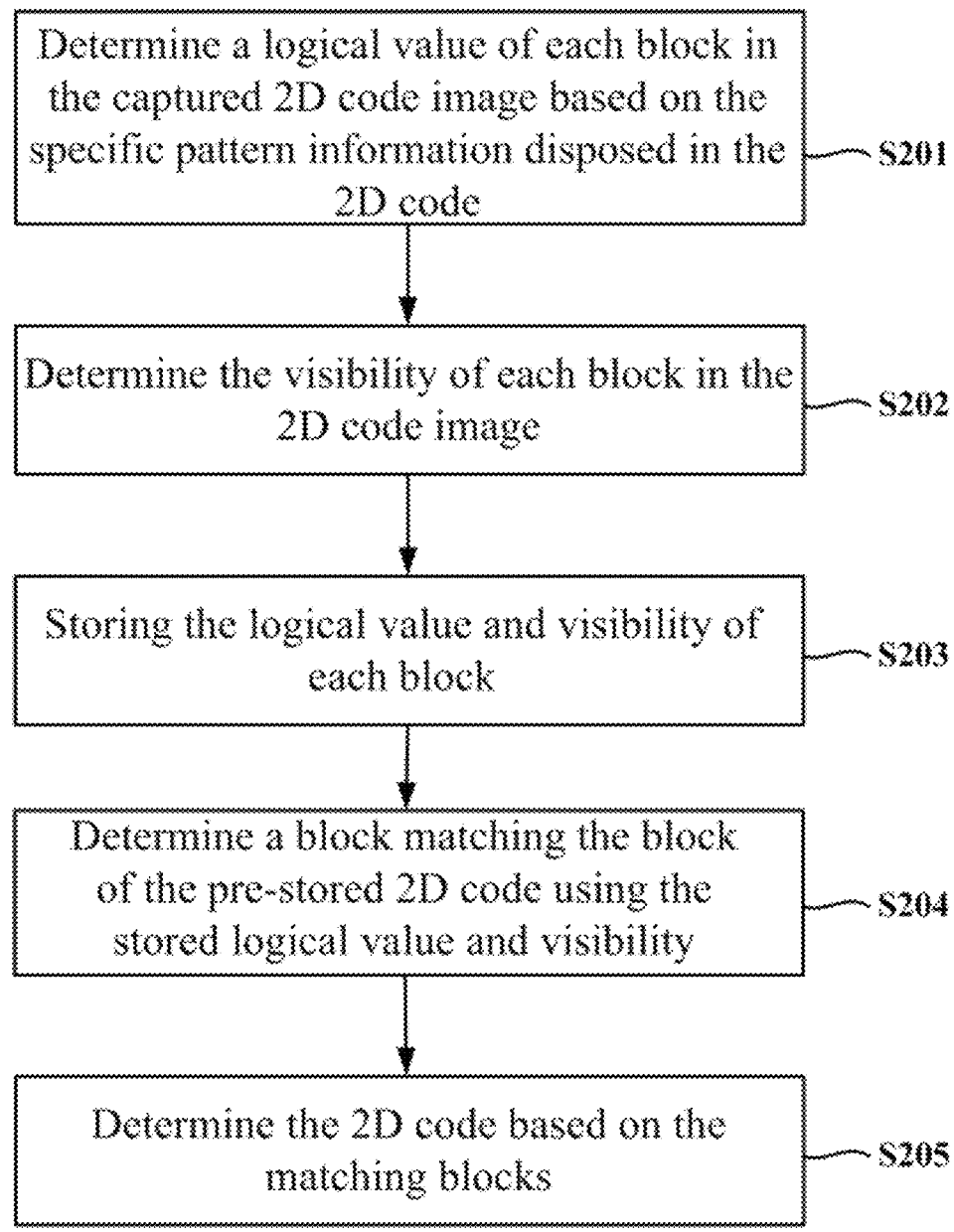
FIG. 7 is a flowchart illustrating a first data extraction process of a method for recognizing 2D code information according to the present disclosure.

However, as shown in FIGS. 5 to 7 below, in addition to the first data extraction process, the logic value and visibility information (a measure indicating the clarity of whether a block is identified as having a white or black value) of each block constituting the QR code may be determined, and only those blocks with visibility greater than or equal to a predetermined reference value may be used for matching with the pre-stored QR code's block information.

Also, the S103 step of performing the second data extraction process to determine a 2D code on the 2D code image for which the first data extraction process has been performed determines a 2D code by setting a first weight for removing specific blocks and setting a second weight for selecting specific blocks based on the information for recognizing outer and inner boundaries of the QR code with respect to the position pattern 10 from the 2D code image or the logic value and visibility information of each block constituting the 2D code image as shown in FIGS. 5 to 7.

Also, the S103 step of the method for recognizing 2D code information according to the present disclosure may improve the 2D code determination accuracy by optionally adding a process of determining whether a captured 2D code image has been tilted or rotated along a specific direction based on the block (block group) to which the second weight is to be applied, as shown in FIGS. 13 to 16, and comparing the captured 2D code image with the 2D code information representing rotation and tilt along a particular direction among the pre-stored QR codes.

Also, the method for recognizing 2D code information of the present disclosure checks if the captured 2D code image corresponds to a specific 2D code recognizes 2D code information, recognizes the 2D code information based on the checking result S104, and displays information of the object (products, goods, or particular structures in a space) to which the 2D code is attached and information related to the object to the user in the form of 3D augmented reality S105.

As described above, the method for recognizing 2D code information of the present disclosure provides an effect of removing blocks located in the peripheral area distant from the central block of a 2D code image and performing computations related to determining the 2D code by selecting blocks exhibiting a high recognition rate among those blocks located in the internal area of the 2D code image.

Also, the method for recognizing 2D code information according to the present disclosure provides an effect of setting logical values and visibility for the blocks constituting a 2D code image, reducing computations and quickly determining the 2D code by excluding those blocks with visibility lower than or equal to a preset reference value from a computational process for determining the 2D code.

Also, the method for recognizing 2D code information according to the present disclosure provides an effect of setting a first weight for removing blocks in the outermost area among the blocks constituting the 2D code image, partitioning blocks in the inner area into a plurality of blocks including at least one or more blocks and setting a second weight that determines whether to select a block group, thereby minimizing the number of computations for determining a 2D code.

Also, the method for recognizing 2D code information according to the present disclosure provides an effect of enabling quick and more accurate determination of a 2D code by calculating the degree of rotation and tilt using block groups including at least one or more blocks among the blocks constituting the 2D code image and a fixed pattern (specific pattern) constituting the 2D code.

FIGS. 5 and 6 illustrate a first data extraction process in a method for recognizing 2D code information according to one embodiment of the present disclosure. FIG. 7 is a flowchart illustrating a first data extraction process of a method for recognizing 2D code information according to the present disclosure.

The method for recognizing 2D code information of the present disclosure may perform a first data extraction process for converting a captured 2D code image into a greyscale image and determining the position pattern 10 and alignment pattern 20 constituting the QR code and rough information on the black and white blocks that store data; the method may additionally perform a process for determining the logical value and visibility corresponding to the degree of visual prominence of each block constituting the 2D code image and storing the determined values in the form of data information, as shown in FIGS. 5 to 7 along with FIG. 1.

Referring to FIGS. 5 to 7, the first data extraction process of the method for recognizing 2D code information according to the present disclosure includes setting a logical value (black: 1, white: 0) of each block constituting a captured 2D code image based on a specific pattern disposed in the 2D code S201, determining visibility of each block of the captured 2D code image S202, storing the logical value and visibility of each block constituting the 2D code image respectively S203, comparing each block with blocks of the pre-stored 2D code using the stored logical value and visibility and determining matching blocks S204, and determining a 2D code using the matching blocks S205.

More specifically, with reference to FIGS. 5 and 6, the method for recognizing 2D code information of the present disclosure may dispose first and second auxiliary timing patterns 150a, 150b to the 2D code in addition to the position pattern 10, timing pattern 50, space 30, version information pattern 60, and format information pattern 40. The area MA shown in the figure but not described represents a margin area, which is intended to separate the cell's outer boundary of the QR code from the position pattern 10; similarly, CB represents the central block of the 2D code image.

As shown in FIG. 5, the timing pattern 50 and the first and second auxiliary timing patterns 150a 150b are disposed between the position pattern 10 and the alignment pattern 20. The first data extraction process of the method for recognizing 2D code information of the present disclosure may determine whether each block is black or white and stores a logical value of "1" or "0" respectively.

At this time, a specific logical value may be set to each block constituting the 2D code image by grouping the blocks into the minimum first block unit B1 representing a black or white block, a second block B2 comprising at least one or more first blocks B1, for example, 4 first blocks B1, or a third block B3 comprising 9 first blocks B1. The logical value may be recorded for each block in a plurality of blocks, or a single representative value may be recorded as the logical value for the plurality of blocks.

Also, the method for recognizing 2D code information of the present disclosure may use the timing pattern 50 and the first and second auxiliary timing patterns 150a, 150b to determine the position of each block for which the logical value has been defined. In other words, the position of a block for which the logical value corresponding to the black or white block may be determined and stored based on the timing pattern 50 and the first and second auxiliary timing patterns 150a, 150b.

Also, as shown in FIG. 6, the method for recognizing 2D code information of the present disclosure may set and store the visibility of the first block B1, second block B2, or third block B3 in the form of the logical value.

For example, as shown in (a) and (b), when the first block B1 is black, the logical value "1" is stored, while, when it is white, the logical value "0" is stored. Also, if the invisible area is 5% or less based on the area occupied by the block in a predetermined criterion for judging a block as black or white, a logic value of Very High may be set. In other words, since the corresponding block is fully visible as one block within the captured 2D code image, the logical value stored in the block may also be considered to be highly accurate.

As shown in (c), when the logic value of white "0" is stored for the first block B1, but 20 to 30% of the block area is not visible, the visibility may be set to a low value. In the same way, as shown in (d), while the logical value of black "1" is stored for the first block B1, if more than 40% of the block area is not visible, the visibility may be set to a very low value.

Here, the logical value and the visibility are described based on the first block B1; however, the same logical value and visibility may be stored based on the block (B2, B3, and so on) that contain at least one or more first blocks B1.

Therefore, the method for recognizing 2D code information of the present disclosure may select blocks with visibility higher than or equal to a particular reference value through the first data extraction process and compare the selected blocks with the blocks in the pre-stored 2D code information.

For example, as shown in FIG. 6, blocks stored with logical values of Very Low or Low visibility may be excluded, after which the 2D code may be determined by calculating blocks that match the blocks in the pre-stored 2D code.

In this way, the method for recognizing 2D code information according to the present disclosure provides an effect of removing blocks located in the peripheral area distant from the central block of a 2D code image and performing computations related to determining the 2D code by selecting blocks exhibiting a high recognition rate among those blocks located in the internal area of the 2D code image.

Also, the method for recognizing 2D code information according to the present disclosure provides an effect of setting logical values and visibility for the blocks constituting a 2D code image, reducing computations and quickly determining the 2D code by excluding those blocks with visibility lower than or equal to a preset reference value from a computational process for determining the 2D code.

Also, the method for recognizing 2D code information according to the present disclosure provides an effect of setting a first weight for removing blocks in the outermost area among the blocks constituting the 2D code image, partitioning blocks in the inner area into a plurality of blocks including at least one or more blocks and setting a second weight that determines whether to select a block group, thereby minimizing the number of computations for determining a 2D code.

Also, the method for recognizing 2D code information according to the present disclosure provides an effect of enabling quick and more accurate determination of a 2D code by calculating the degree of rotation and tilt using block groups including at least one or more blocks among the blocks constituting the 2D code image and a fixed pattern (specific pattern) constituting the 2D code.

FIGS. 8 to 11e illustrate a second data extraction process in a method for recognizing 2D code information according to one embodiment of the present disclosure. FIG. 12 is a flowchart illustrating a second data extraction process of a method for recognizing 2D code information according to the present disclosure.

Referring to FIGS. 8 to 12 along with FIG. 1, the second data extraction process in the method for recognizing 2D code information of the present disclosure includes setting a first weight for removing blocks located in the outermost area from the central block (CB) among the blocks of the 2D code image S301, grouping inner blocks containing code information (data information) of the 2D code image into a plurality of block groups comprising at least one or more blocks S302, setting a second weight for selecting a plurality of block groups S303, and determining a 2D code by comparing the block group set to the second weight with the pre-stored 2D code information S304.

Figure 8:
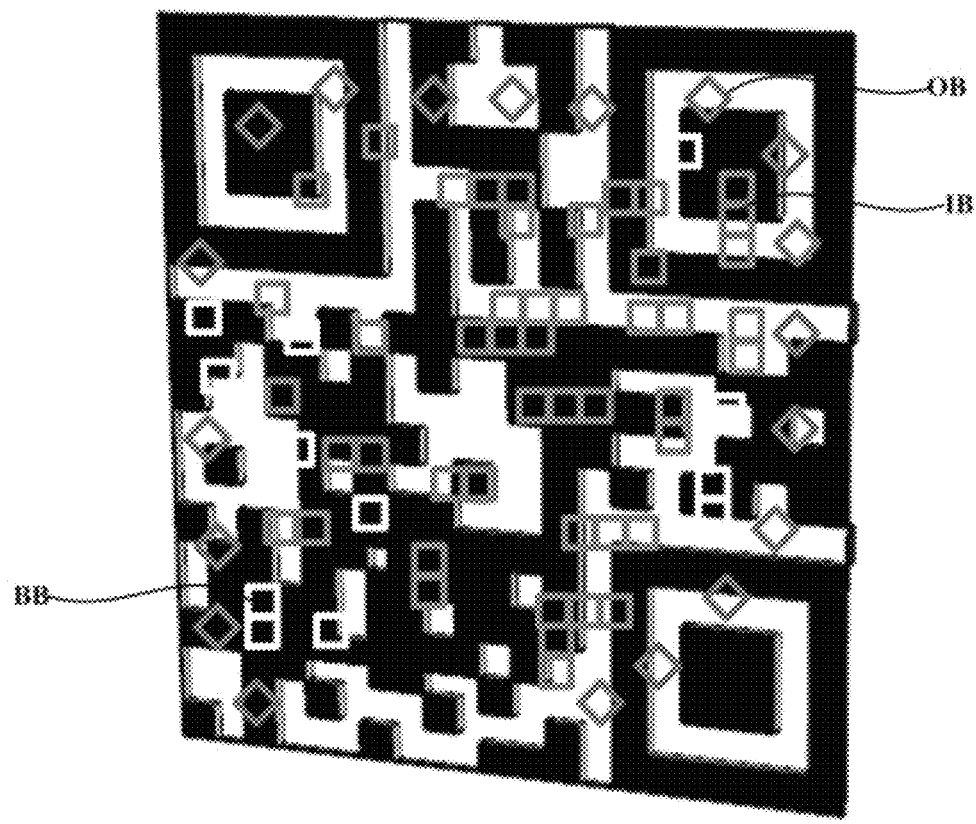
FIG. 8, FIG. 9, FIG. 10A to FIG. 10P, and FIG. 11A to FIG. 11E illustrate a second data extraction process in a method for recognizing 2D code information according to one embodiment of the present disclosure.

Referring to FIG. 8, the captured 2D code image may be an image obtained by roughly recognizing the boundary line between the outside and inside portions with respect to the position pattern 10 and the respective blocks in the code area or, as shown in FIGS. 5 to 7, an image showing logical values and visibilities of the respective blocks constituting the 2D code image.

The second data extraction process in the method for recognizing 2D code information of the present disclosure may determine the blocks located on the boundary line connecting the position pattern 10 and the alignment pattern 20 of the 2D code as outer blocks (OBs), determine the timing pattern 50, first and second auxiliary timing patterns 150a, 150b, and blocks located in the central block (CB) area as inner blocks (IBs), and determine the block between the inner block (IB) and the outer block (OB) as the boundary block (BB).

For example, the outer block (OB), inner block (IB), and boundary block (BB) may be distinguished by setting a predetermined reference distance along the straight and diagonal directions from the central block (CB), or the outer block (OB) may be distinguished based on the patterns constituting the 2D code. More specifically, the blocks located outside with respect to a line connecting the position pattern 10 and the alignment pattern 20 may be determined as the outer block (OB), the blocks located between the area within the inner code area along the respective edges of the timing pattern 50, the first and second auxiliary timing patterns 150a, 150b, and the position pattern 10 may be determined as the boundary block (BB), or the blocks located in the area within the inner code area along the respective edges of the position pattern 10 may be determined as the inner block (IB).

Figure 9:
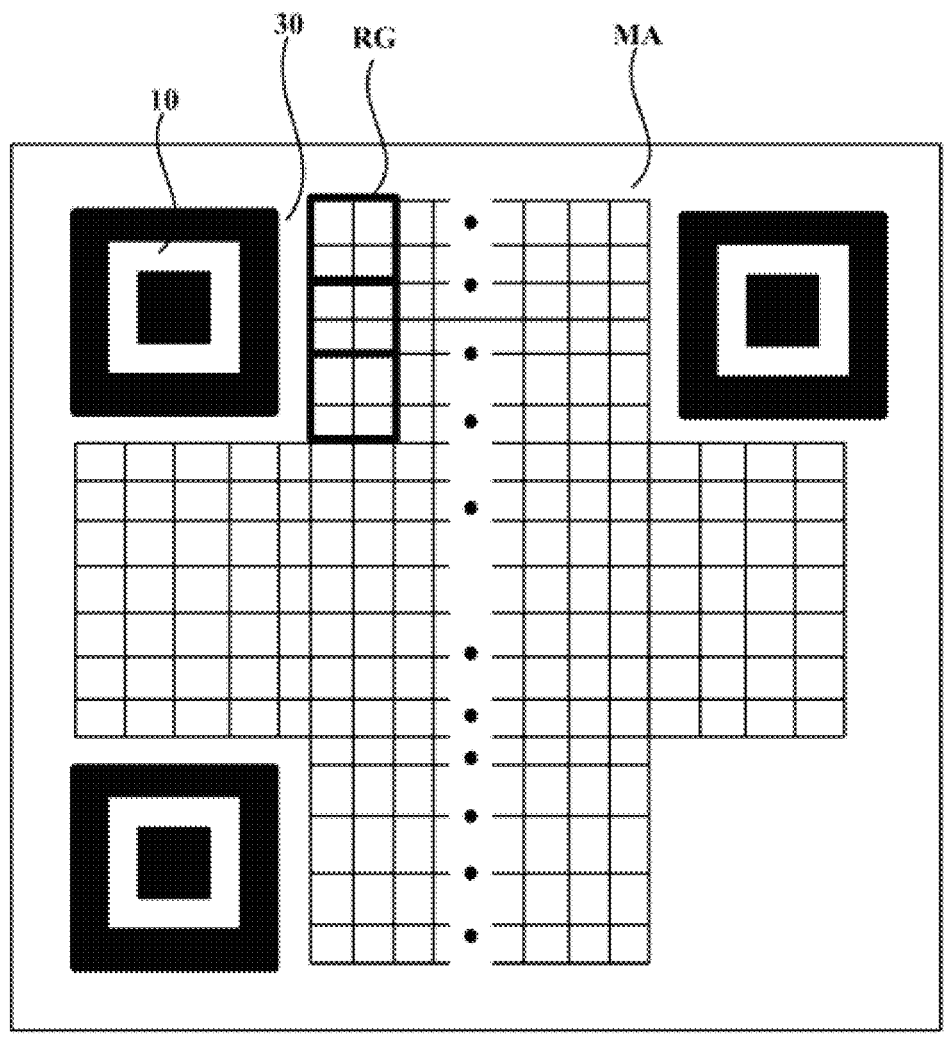
Figure 10A:
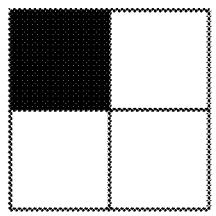
Figure 10B:
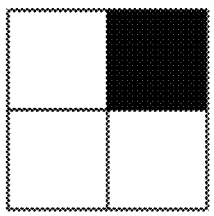
Figure 10C:
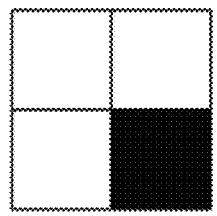
Figure 10D:
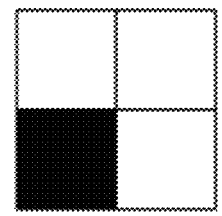
Figure 10E:
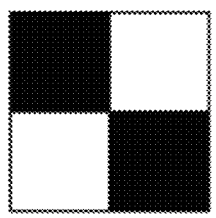
Figure 10F:
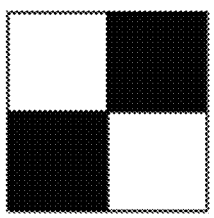
Figure 10G:
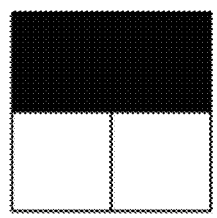
Figure 10H:
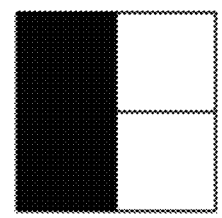
Figure 10I:
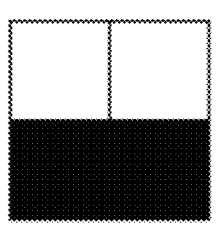
Figure 10J:
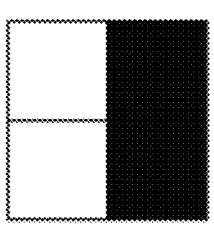
Figure 10K:
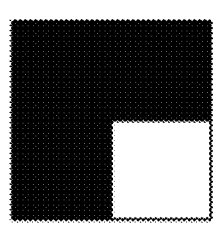
Figure 10L:
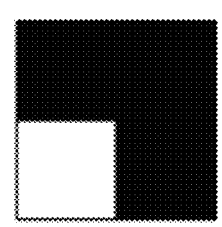
Figure 10M:
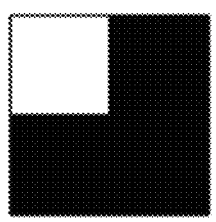
Figure 10N:
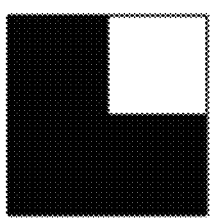
Figure 10O:
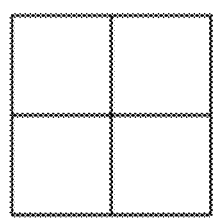
Figure 10P:
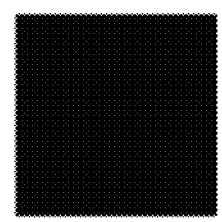

As shown in FIG. 9, the second data extraction process determines the outer block (OB), inner block (IB), and boundary block (BB) in units of block groups (BG) comprising at least one or more blocks and sets a first weight for removing a block group from the block group (RG) located in the outer block (OB).

The second data extraction process operates as described above because, when the 2D code image is included along a specific direction, the position deviation of the outer blocks (OB) is the largest, and that of the inner blocks (IB) is small. Therefore, when the 2D code image is obtained after being rotated or tilted, the outer blocks (OB) among the blocks constituting the obtained 2D code image show a large position deviation, but the inner blocks (IB) do not show a noticeable position deviation from the state before rotation or tilt is applied.

By using the characteristics above, the method for recognizing 2D code information of the present disclosure significantly reduces the number of computations by excluding the outer blocks (OB) in the calculation process for 2D code recognition, thereby enabling quick recognition of the 2D code.

Also, the method for recognizing 2D code information of the present disclosure may set the second weight for selecting a plurality of block groups (RB) determined as the inner block (IB) according to the logical value set for the block group, as shown in FIGS. 10, 11a to 11e.

For example, when the block group (RB) is composed of four blocks, as shown in FIG. 10, four blocks have black and white colors, generating 16 types of block groups (RB). (a) to (d) show the cases in which only one block within the block group (RB) is black (logical value 1), while the others are white (logical value 0), where their recognition rates have the same value.

Also, (e) to (j) show the cases in which two out of four blocks comprising a block group (RB) are block, and the other two are white, where their recognition rates are not the same. In other words, when black and white blocks alternate as shown in (e) and (f), the corresponding recognition rates are high; however, as shown in (g) to (j), when consecutive blocks share the same color, for example, black or white, the recognition rates of the consecutive blocks are low, leading to a lower recognition rate compared to the block groups of (e) and (f).

In the cases of (k) to (n), since consecutive three blocks out of the four blocks constituting a block group (RB) share the same color (either black or white), their recognition rates are lower compared to the block groups (RB) of (g) to (j).

In the cases of (o) and (p), since all four blocks within a block group (RB) are of the same color (either black or white), their recognition rates are the lowest.

Therefore, the method for recognizing 2D code information of the present disclosure sets the second weight according to the arrangement pattern of black or white blocks constituting the block group (RB). The second weight may be a weight related to whether to select a block group (RB) to determine the 2D code.

Figure 11A:
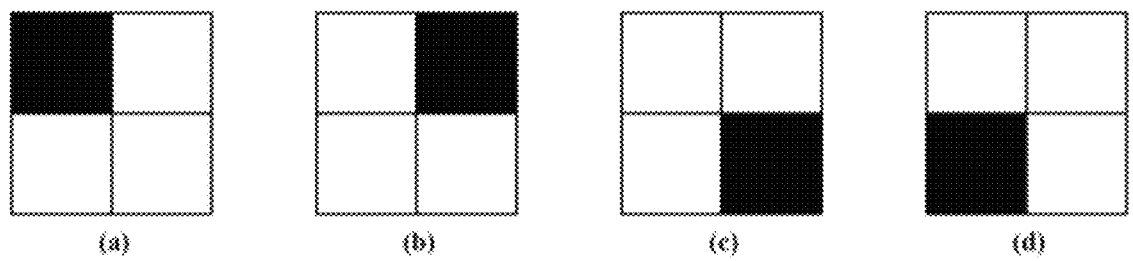
Figure 11B:
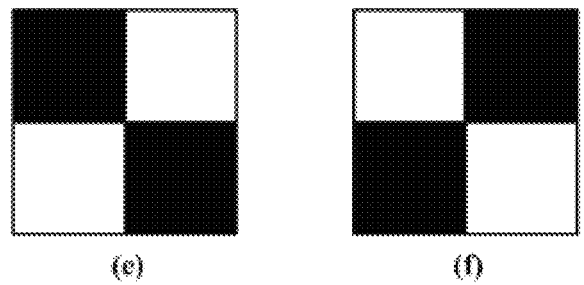
Figure 11C:
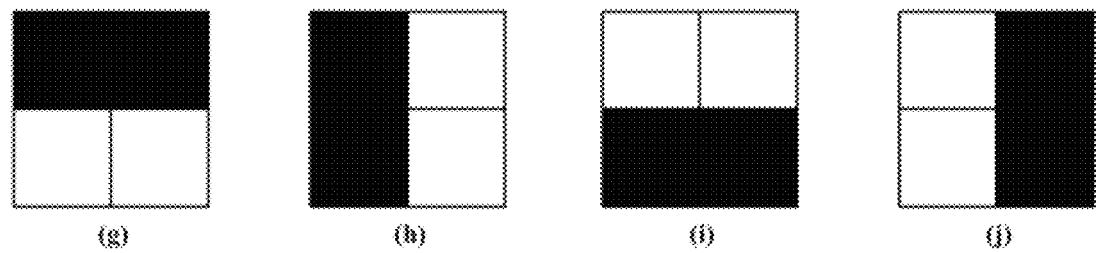
Figure 11D:
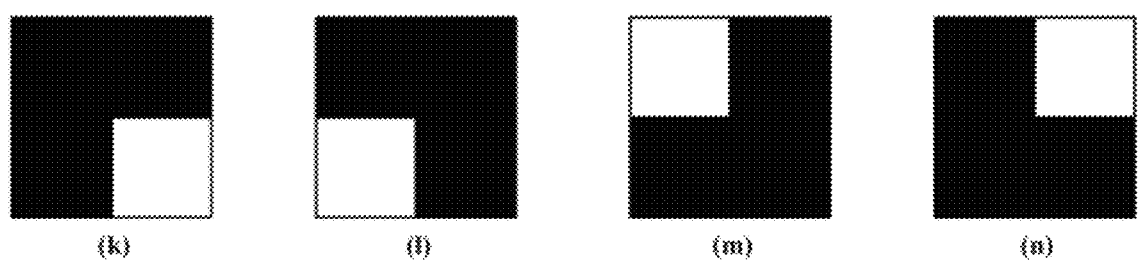

Block groups (RB) may be grouped as shown in FIGS. 11a to 11e according to the recognition rates described above. FIG. 11a shows a case where only one block is black out of the four blocks constituting the block group (RB); from a different viewpoint, it may be considered that three consecutive blocks have white. Therefore, the recognition rates of the block groups in FIG. 11a will be the same as in the cases where three consecutive blocks among the four blocks constituting the block group (RB) are black, as shown in FIG. 11d.

Therefore, the method for recognizing 2D code information of the present disclosure may determine that the highest recognition rate is obtained when black and white blocks alternate among the four blocks constituting the block group (RB), as shown in FIG. 11b, which accordingly sets the highest selection priority to the corresponding cases.

Figure 11E:
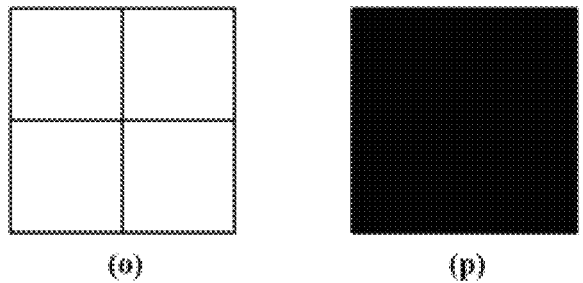
Figure 12:
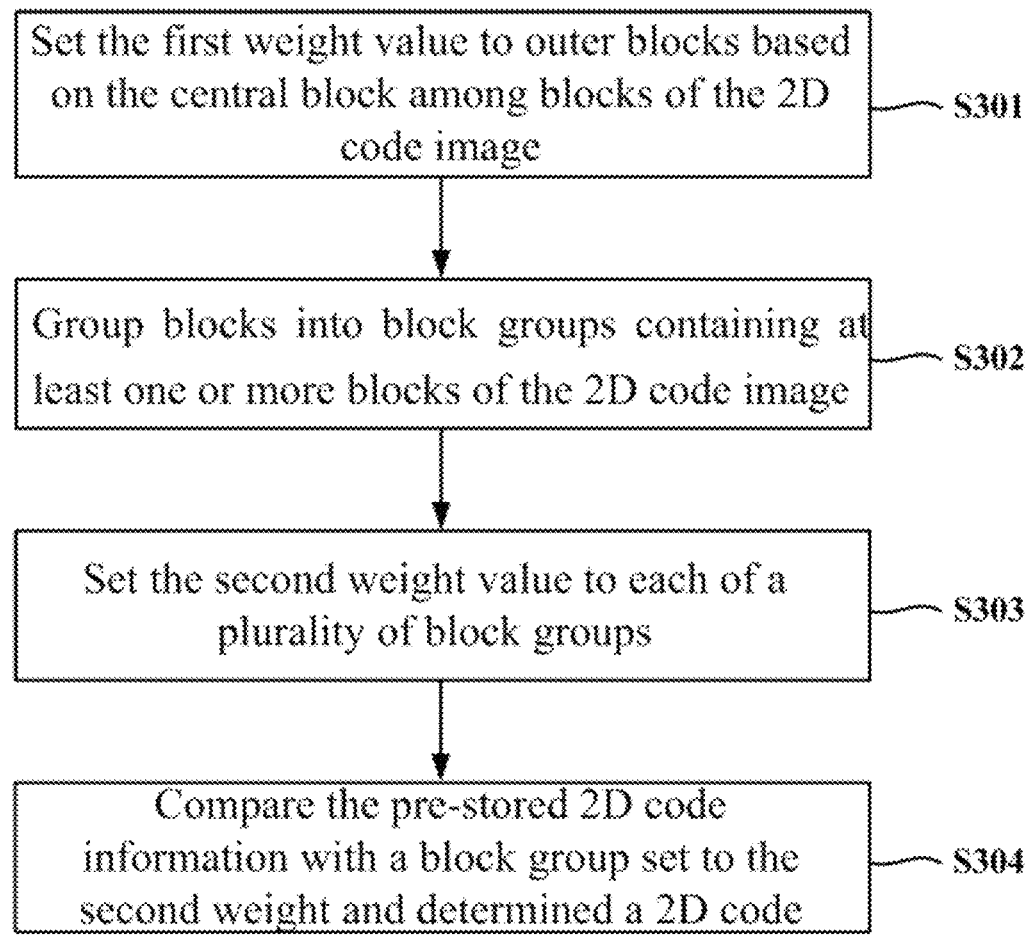
FIG. 12 is a flowchart illustrating a second data extraction process of a method for recognizing 2D code information according to the present disclosure.

FIG. 11c sets a weight with a lower selection priority than FIG. 11b, FIGS. 11a and 11d set a weight with a lower selection priority than FIG. 11c, and FIG. 11e sets a weight with the lowest selection priority.

Therefore, the second data extraction process in the method for recognizing 2D code information of the present disclosure may set the first weight to remove the outer block (OB) from the calculation process as shown in FIG. 8 and, also for the inner block (IB), select only the block group (RB) with the highest recognition rate, as shown in FIG. 11b, to perform the matching process with the 2D code blocks.

In some cases, the matching process may be performed by excluding only the block group type of FIG. 11e, or the 2D code may be determined by performing the matching process by selecting only the block groups (RB) of FIGS. 11b and 11c.

As described above, the method for recognizing 2D code information according to the present disclosure provides an effect of removing blocks located in the peripheral area distant from the central block of a 2D code image and performing computations related to determining the 2D code by selecting blocks exhibiting a high recognition rate among those blocks located in the internal area of the 2D code image.

Also, the method for recognizing 2D code information according to the present disclosure provides an effect of setting logical values and visibility for the blocks constituting a 2D code image, reducing computations and quickly determining the 2D code by excluding those blocks with visibility lower than or equal to a preset reference value from a computational process for determining the 2D code.

Also, the method for recognizing 2D code information according to the present disclosure provides an effect of setting a first weight for removing blocks in the outermost area among the blocks constituting the 2D code image, partitioning blocks in the inner area into a plurality of blocks including at least one or more blocks and setting a second weight that determines whether to select a block group, thereby minimizing the number of computations for determining a 2D code.

Also, the method for recognizing 2D code information according to the present disclosure provides an effect of enabling quick and more accurate determination of a 2D code by calculating the degree of rotation and tilt using block groups including at least one or more blocks among the blocks constituting the 2D code image and a fixed pattern (specific pattern) constituting the 2D code.

Figure 13:
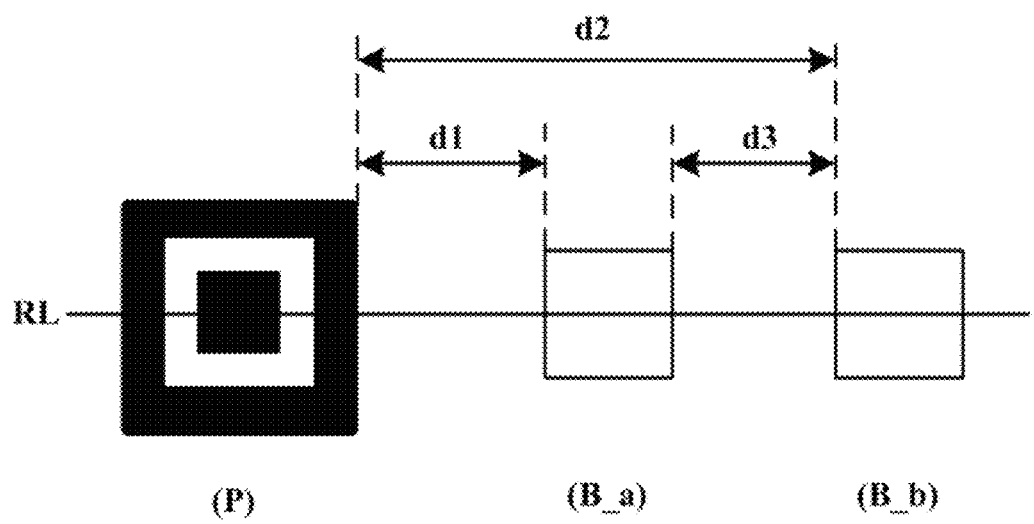
FIG. 13, FIG. 14 and FIG. 15 illustrate a process of recognizing 2D code information by determining an inclination direction of a captured 2D code image in a method for recognizing 2D code information according to one embodiment of the present disclosure.
Figure 14:
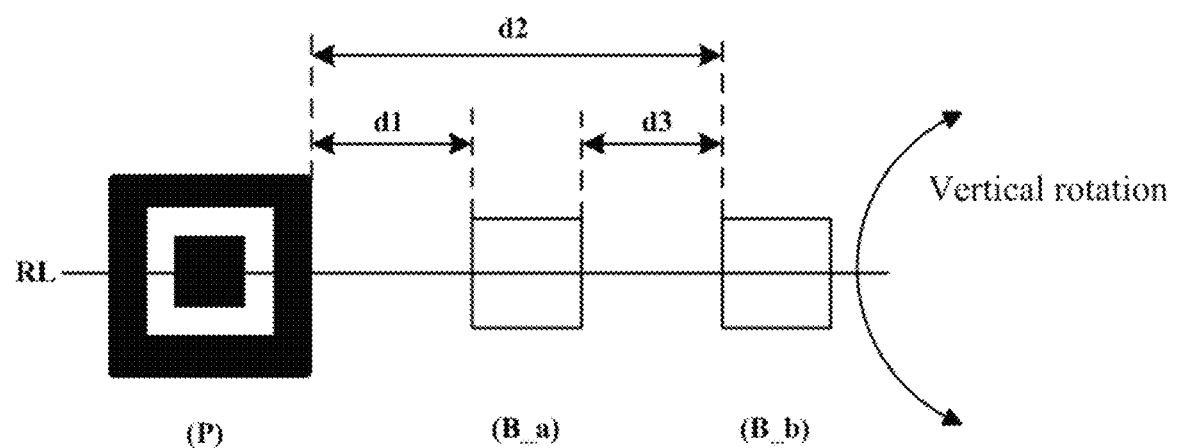
Figure 15:
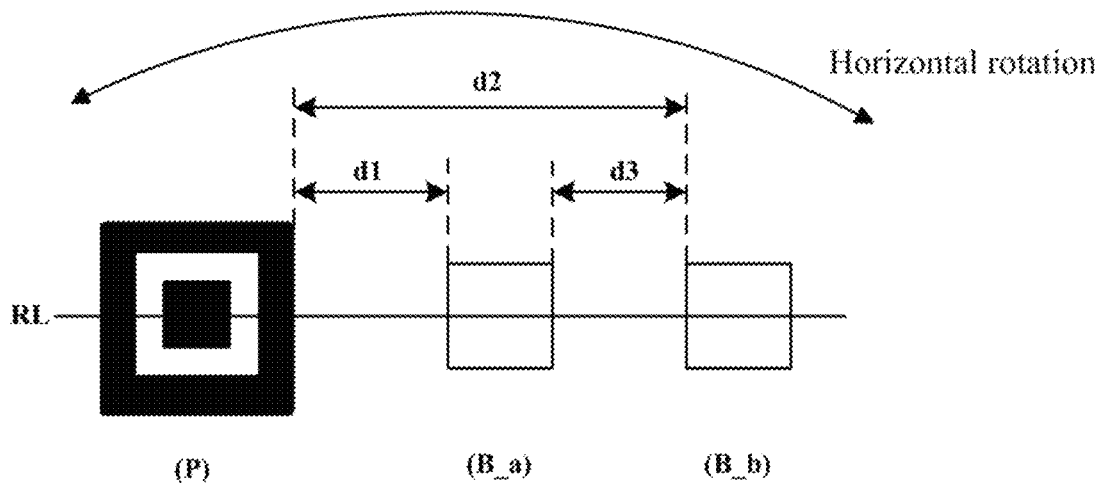
Figure 16:
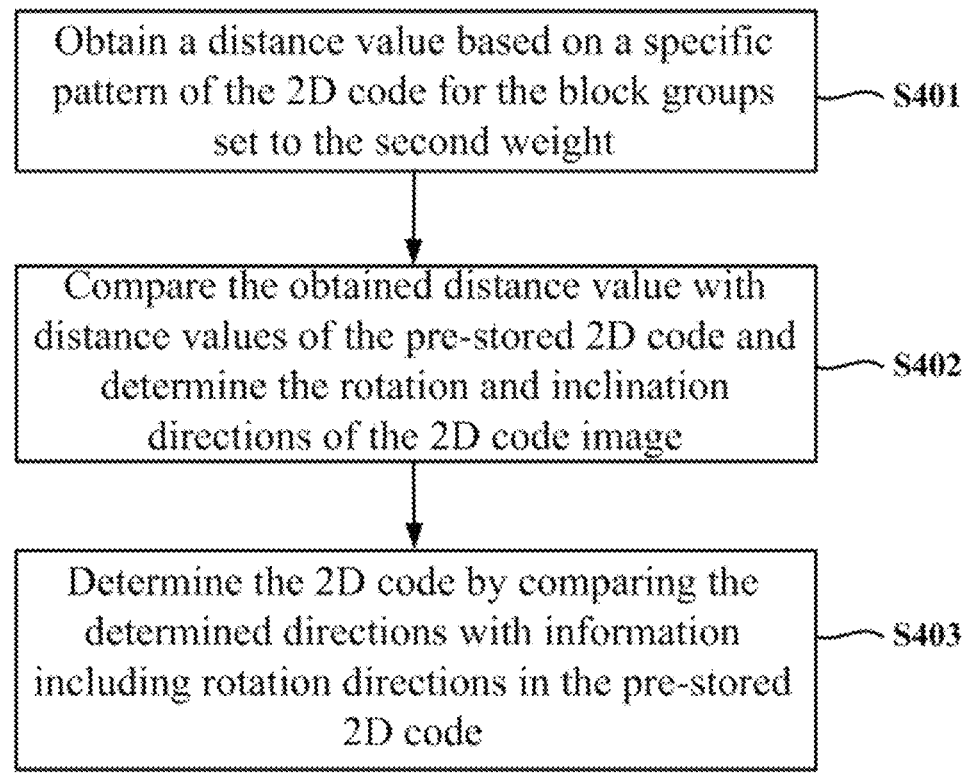
FIG. 16 is a flowchart illustrating a process of determining a 2D code using information on the inclination direction of a 2D code image in a method for recognizing 2D code information according to the present disclosure.
Figure 17:
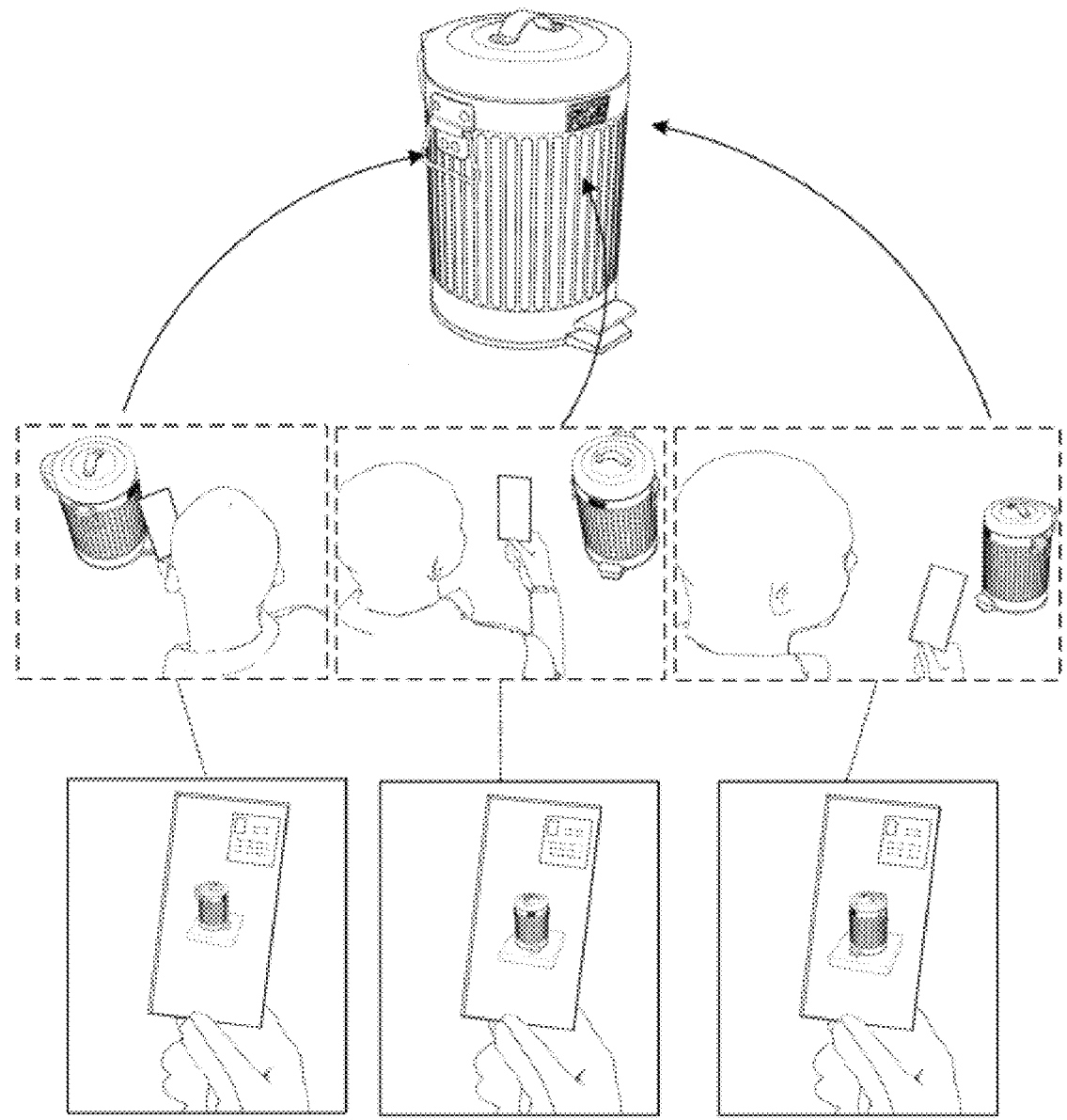
FIG. 17 illustrates an example in which a 2D code is recognized and applied to augmented reality by a method for recognizing 2D code information according to the present disclosure.

FIGS. 13 to 15 illustrate a process of recognizing 2D code information by determining an inclination direction of a captured 2D code image in a method for recognizing 2D code information according to one embodiment of the present disclosure. FIG. 16 is a flowchart illustrating a process of determining a 2D code using information on the inclination direction of a 2D code image in a method for recognizing 2D code information according to the present disclosure. FIG. 17 illustrates an example in which a 2D code is recognized and applied to augmented reality by a method for recognizing 2D code information according to the present disclosure.

Referring to FIGS. 1, 12, and 13 to 16, the second data extraction process in the method for recognizing 2D code information of the present disclosure may selectively apply the process of determining the degree of rotation or tilt of a captured 2D code image, as described in FIG. 12.

Therefore, the second data extraction process in the method for recognizing 2D code information of the present disclosure includes obtaining a distance value based on a specific pattern of the 2D code for a block group (RB) to which the second weight has been set S401, determining the degree of rotation and tilt of the 2D code image by comparing the distance value with distance values of the pre-stored 2D code S402, and determining the 2D code by consulting the pre-stored 2D code information corresponding to the determined rotation and tilt S403.

More specifically, the method for recognizing 2D code information of the present disclosure may determine the rotation and tilt by using at least two block groups located on a straight line with respect to block groups (RB) to which the second weight has been set and a reference pattern, for example, the position pattern P disposed in the 2D code.

Referring to FIG. 13, the position pattern P, the first block group B_a, and the second block group B_b of the 2D code image are located on the reference line, the distance between the position pattern P and the first block group B_a is denoted as the first distance d1, the distance between the position pattern P and the second block group B_b is denoted as the second distance d2, and the distance between the first block group B_a and the second block group B_b is denoted as the third distance d3.

The first to third distances d1, d2, d3 may be the distances determined when the 2D code image is not rotated or tilted along a specific direction.

Also, as shown in FIG. 14, when the 2D code image rotates around the reference line RL connecting the first block group B_a and the second block group B_b, the first to third distances d1, d2, d3 do not change.

Meanwhile, as shown in FIG. 15, when the 2D code image rotates horizontally in the plane containing the reference line RL connecting the first block group B_a and the second block group B_b, the first to third distances d1, d2, d3 are changed to d1', d2', d3', respectively.

Therefore, as shown in FIG. 9, since the position pattern P constituting the 2D code is located within the three corner area of the rectangle, the direction along which the 2D code image rotates and inclines may be determined based on the change information of the first to third distances d1, d2, d3.

The pre-stored 2D code information for comparison stores not only the information for the case without rotation and inclination but also the information corresponding to the rotation and inclination direction; the matching process is then performed based on the information on the rotation and inclination direction of the 2D code image determined in FIGS. 14 and 15; consequently, the 2D code may be determined quickly and accurately.

As shown in FIG. 17, the method for recognizing 2D code information of the present disclosure may display an object with varying appearances based on the directions and distances between a user and the object in the form of augmented reality together with the object's information together.

The method for recognizing 2D code information according to the present disclosure provides an effect of removing blocks located in the peripheral area distant from the central block of a 2D code image and performing computations related to determining the 2D code by selecting blocks exhibiting a high recognition rate among those located in the internal area of the 2D code image.

Also, the method for recognizing 2D code information according to the present disclosure provides an effect of setting logical values and visibility for the blocks constituting a 2D code image, reducing computations and quickly determining the 2D code by excluding those blocks with visibility lower than or equal to a preset reference value from a computational process for determining the 2D code.

Also, the method for recognizing 2D code information according to the present disclosure provides an effect of setting a first weight for removing blocks in the outermost area among the blocks constituting the 2D code image, partitioning blocks in the inner area into a plurality of blocks including at least one or more blocks and setting a second weight that determines whether to select a block group, thereby minimizing the number of computations for determining a 2D code.

Also, the method for recognizing 2D code information according to the present disclosure provides an effect of enabling quick and more accurate determination of a 2D code by calculating the degree of rotation and tilt using block groups including at least one or more blocks among the blocks constituting the 2D code image and a fixed pattern (specific pattern) constituting the 2D code.

The embodiments of the present disclosure as described above may be implemented in the form of program commands which may be executed through various types of computer means and recorded in a computer-readable recording medium. The computer-readable recording medium may include program commands, data files, and data structures separately or in combination thereof. The program commands recorded in the computer-readable recording medium may be those designed and configured specifically for the present disclosure or may be those commonly available for those skilled in the field of computer software. Examples of a computer-readable recoding medium may include magnetic media such as hard-disks, floppy disks, and magnetic tapes; optical media such as CD-ROMs and DVDs; and hardware devices specially designed to store and execute program commands such as ROM, RAM, and flash memory. Examples of program commands include not only machine codes such as those generated by a compiler but also high-level language codes which may be executed by a computer through an interpreter and the like. The hardware device may be configured to be operated by one or more software modules to perform the operations of the present disclosure, and vice versa.

Specific implementation of the present disclosure are embodiments, which does not limit the technical scope of the present disclosure in any way. For the clarity of the specification, descriptions of conventional electronic structures, control systems, software, and other functional aspects of the systems may be omitted. Also, connection of lines between constituting elements shown in the figure or connecting members illustrate functional connections and/or physical or circuit connections, which may be replaceable in an actual device or represented by additional, various functional, physical, or circuit connection. Also, if not explicitly stated otherwise, "essential" or "important" elements may not necessarily refer to constituting elements needed for application of the present disclosure.

Also, although detailed descriptions of the present disclosure have been given with reference to preferred embodiments of the present disclosure, it should be understood by those skilled in the corresponding technical field or by those having common knowledge in the corresponding technical field that the present disclosure may be modified and changed in various ways without departing from the technical principles and scope specified in the appended claims. Therefore, the technical scope of the present disclosure is not limited to the specifications provided in the detailed descriptions of this document but has to be defined by the appended claims.

DETAILED DESCRIPTION OF MAIN ELEMENTS

10: Position pattern
20: Alignment pattern
30: Space
40: Format information pattern
50: Timing pattern
60: Version information pattern
150a: First auxiliary timing pattern
150b: Second auxiliary timing pattern
MA: Margin area
OB: Outer block
IB: Inner block
BB: Boundary block

What is claimed is:

1. A method for recognizing 2D code information, which is related to a method for recognizing 2D code information by capturing a 2D code image composed of rectangular cells, the method comprising:
    obtaining a 2D code image using a mobile device equipped with a camera or an image capture device;
    performing a first data extraction process that identifies individual blocks storing a position pattern, an alignment pattern, and data from the obtained 2D code image;
    setting a first weight for removing outer blocks located outside a line connecting the position pattern and the alignment pattern with respect to a central block among the individual blocks of the 2D code image on which the first data extraction process has been performed;
    partitioning inner blocks located inside the position pattern and the alignment pattern among individual blocks of the 2D code image into a plurality of block groups composed of at least one or more inner blocks and setting a second weight for determining whether to select a block group according to a recognition rate of blocks constituting each block group;
    removing outer blocks set to the first weight and selecting a block group for which a weight has been set as having a high recognition rate among block groups set to the second weight;
    determining and recognizing a 2D code by comparing the selected block group with a block group of a pre-stored 2D code; and
    displaying an object to a user in the form of augmented reality based on the recognized 2D code information.

2. The method of claim 1, wherein a 2D code for recognizing the 2D code information includes a position pattern disposed at three neighboring corners among corners of a rectangular cell and an alignment pattern disposed at one corner;
    a timing pattern disposed between the position patterns; and
    first and second auxiliary timing patterns disposed between the alignment pattern and the position pattern and facing the timing pattern.

3. The method of claim 2, wherein the first data extraction process includes:
    setting a logical value corresponding to black or white for each block constituting the obtained 2D code image;

setting a logical value representing visibility corresponding to the degree of visual prominence of each block constituting the obtained 2D code image;

determining the position of each block constituting the obtained 2D code image using the timing pattern and the first and second auxiliary timing patterns constituting the 2D code; and when the visibility of each block is lower than or equal to a preset reference value, excluding the corresponding blocks from computations for determining a 2D code.

4. The method of claim 3, wherein the partitioning of the inner blocks into a plurality of block groups composed of at least one or more inner blocks includes partitioning four blocks into one block group.

5. The method of claim 4, wherein the setting of the second weight to the block group includes considering a block group whose constituting four blocks show black and white colors in an alternate fashion as yielding the highest recognition rate and setting a weight with the highest selection priority to the corresponding block group.

6. The method of claim 5, wherein the setting of the second weight to the block group includes considering a block group whose constituting four blocks are all in black or white color as yielding the lowest recognition rate and setting a weight with the lowest selection priority to exclude the corresponding block group from computations for determining a 2D code.

7. The method of claim 6, including:

when the second weight is set to the block group, obtaining distance values between the position pattern and at least two selected block groups located on a straight line passing through the position pattern;

comparing the obtained distance values with distance values between the position pattern and block groups in pre-stored 2D code information and determining if there exists a change in the distance values; and if there is no change between the obtained distance values and the distance values in the pre-stored 2D code information, determining that rotation and tilt occur in the direction orthogonal to a straight line connecting the position pattern and at least two block groups.

8. The method of claim 7, wherein, when the obtained distance values are different from the distance values in the pre-stored 2D code information, determining that rotation and tilt have occurred in the horizontal direction or in an inclined direction at a predetermined angle from the horizontal direction with respect to a straight line connecting the position pattern and at least two block groups.

* * * * *